United States Patent [19]
Jenkins

[11] Patent Number: 5,136,414
[45] Date of Patent: Aug. 4, 1992

[54] PERMANENT MAGNETIC MEANS FOR POSITIONING A ROTATABLE ELEMENT TO A PRESELECTED POSITION

[76] Inventor: Vincent C. Jenkins, 17077 Chico Dr., Perris, Calif. 92370

[21] Appl. No.: 578,447

[22] Filed: Sep. 7, 1990

[51] Int. Cl.⁵ ............................................. G02B 26/08
[52] U.S. Cl. .................................... 359/214; 359/213; 359/225
[58] Field of Search ........................... 350/6.1, 6.5, 6.6; 359/196–226; 310/36–48

[56] References Cited

U.S. PATENT DOCUMENTS

| | | | |
|---|---|---|---|
| 3,621,133 | 11/1971 | Baker et al. | 350/6.6 |
| 3,678,308 | 7/1972 | Howe | 310/36 |
| 4,073,567 | 2/1978 | Lakerveld et al. | 350/6.5 |
| 4,175,832 | 11/1979 | Umeki et al. | 350/6.6 |
| 4,316,648 | 2/1982 | Lissack | 350/6.6 |
| 4,538,254 | 8/1985 | Hattori et al. | 369/43 |
| 4,560,869 | 12/1985 | Hien et al. | 350/6.6 |
| 4,959,569 | 9/1990 | Stokes | 350/6.6 |
| 4,974,918 | 12/1990 | Delache et al. | 350/6.6 |

FOREIGN PATENT DOCUMENTS

48603 3/1986 Fed. Rep. of Germany ........ 350/66

*Primary Examiner*—Bruce Y. Arnold
*Assistant Examiner*—Thong Nguyen
*Attorney, Agent, or Firm*—L. Lee Humphries

[57] ABSTRACT

Permanent magnets are employed to continually urge an rotatable element, such as an oscillating, motor-driven shaft toward a preselected position. When the torque from the motor becomes minimal or is removed, the shaft is returned to a pre-selected, or rest, position. A magnet is disposed on the rotatable shaft and two additional magnets, one disposed on each side of the first magnet, constantly repel it toward a location between the two additional magnets. Such constant repelling is useful in scanners, light-choppers and the like and helps to achieve a harmonic-like motion. In a laser scanner, when the shaft is returned to its preselected position, the radiation is undeflected from a preselected axis. The magnets take the place of springs and are superior to them in precision, length of life and in ease of installation and adjustment.

24 Claims, 4 Drawing Sheets

PERMANENT MAGNETIC MEANS FOR POSITIONING A ROTATABLE ELEMENT TO A PRESELECTED POSITION

BACKGROUND OF THE INVENTION

It is often desired to position a rotatable element, such as a motor shaft to a preselected position. For example, it may be desired to continually urge an oscillatable shaft toward a preselected, or rest position. Thus, when the oscillating torque is removed from the shaft, the shaft is returned to such preselected, or rest, position. If the shaft carries a mirror or the like, the mirror is returned to a particular angular position, which is determined by the rest position of the shaft. Often, such a shaft is driven by a small, bi-directional, low-inertia stepper motor.

Small stepper motors are readily available and may be purchased, for example, capable of providing incremental shaft rotation of 7.5 degrees and multiples thereof, depending on the wiring and the drive signal. Their consumed power, for example, may be on the order of 2 watts, continuous duty, developing approximately 2 ounce-inches of torque. Such motor might be driven by a 7 to 12 volt, a-c signal, which would cause the motor shaft to angularly rotate, or oscillate, as the alternating signal reverse polarity. That is, the motor shaft reverses direction as the electrical signal reverses.

For example, a laser scanner (used, for example, for light display purposes) may utilize such a bi-directional stepper motor, which is excited by a-c electrical signals to rotate its shaft through a small angle, say, plus and minus 15 degrees. The shaft carries a small mirror which receives and reflects a laser beam. When the shaft is angularly rotated, or oscillated, by the motor, it causes the reflected laser beam to sweep through an angle. When the signals to the motor are weakened or removed, it is desired that the shaft return smoothly from its angular rotation to a rest position. To achieve a smooth, harmonic-like motion, the shaft is ordinarily spring-loaded. Such spring-loading returns the shaft to a position approximately central of its sweep. It is appreciated, however, that the system could be driven to scan more to one side of its rest position than another. In such a case, the shaft's rest position may not be at the center of the scan.

The device of the invention provides smooth return of the shaft to its rest position by magnetic repulsion, rather than by use of a spring, as is customary in such devices.

The magnetic repulsion device of the invention may be used on any angularly rotatable shaft (or on structure attached to such shaft) which requires a smooth return to a rest position. The motion of the shaft, upon application of electrical signals to the driving motor, or prime mover, is harmonic motion or akin thereto.

The shaft may be used, in other instances, to carry oscillating, light chopper means, light-switching means, or other devices. The device of the invention be used not only for shafts carrying radiation transmitting devices, such as the mirrors for laser beam scanners, but may also be used in connection with shafts driving radiation receiving devices, such as scanners (including mirrors, for example,) receiving laser beams, microwaves, light, or other electromagnetic or acoustic waves.

For example, a sensor may, by means of the scanner herein, be made to scan an area for incoming infrared, visible light, invisible light, or other radiation.

In summary, the device may be one which either transmits or receives radiation.

In any event, what is desired is the capability to urge a driven shaft toward a preselected position. When driving power, or torque, is removed from the shaft, it is desired to cause a smooth return of the driven shaft to the preselected position. In the case of a laser scanner or light chopper used for light display purposes, this results in smoothly-changing figures and light displays. At times, abrupt changes in the displays may be desirable and may be achieved by the driving motor or by light choppers or other means. The device of the invention is particularly suited to operating under such circumstances.

Commonly, the return of a shaft or lever arm to its rest position in mechanical and electro-mechanical devices is achieved by a spring. In this invention the magnets take the place of springs. The magnets are superior to springs in length of life and in ease of installation and adjustment. In structures which oscillate rapidly over long periods of time, such as a laser scanner, or a light chopper, the spring is under continually changing stress, which ultimately causes fatigue, degradation and failure of the spring to return the shaft to its rest position. There may even be a certain amount of slop, in the mechanical spring construction, causing failure of the system to respond consistently. Further, spring mechanisms suffer from hysteresis, both at high and low levels of tension, torsion or compression.

Further, it is extremely difficult to assemble and adjust a spring-centering means so that it provides equal return torque from angular excursions of a shaft in both directions. Bi-direction spring loading is not easily obtained, changed or adjusted.

On the other hand, the device of the invention, a magnetic centering means is extraordinarily simple, does not suffer from fatigue and experiences little or no hysteresis effects. Permanent magnets are readily available with a magnetic permanence that far exceeds the life of a spring.

The magnetic device of the invention is readily adjustable as to strength and position. It is difficult to change the spring constant of a spring. In the case of permanent magnets, a simple adjustment of the position of the magnets relative to each other, changes the effective spring constant, (or, more precisely, the magnetic coercion). Further, diminutive, ceramic magnets (sintered from barium and iron oxide powders) of various strengths and sizes are readily available. They are almost impossible to demagnetize except in extreme heat. Small, disk-shaped magnets which would be suitable for use in connection with the 2-watt stepper motor mentioned above, would likely be on the order of 0.125 inches thick. They would have a diameter of, say, 0.3 of an inch and the north and south poles would be on opposite faces of the disk. Such magnets, when properly oriented with respect to each other, would have a magnetic coercion (repulsion) between them, when in close proximity, that would not be overcome by the torque of the stepper motor. Thus, the magnets would not, in the usual case, strike each other.

It is also noted that, in the device of the invention, as the deflection increases, the restoring force increases nonlinearly. On the other hand, in the case of a spring, the restoring force increases linearly, unless the spring is specially constructed to have a variable spring constant.

Another feature of the magnetic centering device, in one embodiment, is that the weight of one of the magnets, which is attached to the shaft, hangs as a pendulum, to aid in returning the shaft to a rest position. This is not so in the case of a spring because it must be anchored at both ends in order to be effective.

PRIOR ART

U.S. Pat. No. 4,316,648, for a By-Directional (sic) Brushless Motor Scanner, teaches using springs (of various designs) to provide a force on an optical scanner motor shaft and return it toward a rest position.

U.S. Pat. No. 4,073,567, for a Pivoting Mirror Device, teaches driving a pivoting mirror with electric control signals and returning the pivoting mirror to a neutral, undeflected position by the attraction between permanent magnets. Such magnets also, through such attraction, load the pivot bearing which supports the mirror.

SUMMARY OF THE INVENTION

In one embodiment of the invention, a shaft is driven in oscillation, say plus and minus 15 degrees, by a small motor. It is desired that the shaft achieve harmonic motion and continually be urged toward a preselected position. When the driving torque is removed from such shaft, the shaft is returned to such preselected position. Such shaft has attached thereto, a first permanent magnet means. Additional permanent magnet means are disposed on each side of such first permanent magnet means to repel the shaft toward a preselected position. Assume, for example, that the shaft is angularly driven through an angle by a small motor or some other prime mover, such as a solenoid. When the signal to the prime mover is removed, the torque on the shaft from the prime mover is removed, and the shaft is returned to its preselected position by the magnetic repulsion among the permanent magnets. Such preselected position may be viewed as a "rest" position.

Again, a first permanent magnet means is attached to the shaft and a second permanent magnet means is disposed on one side of the first magnet means. A third permanent magnet means is disposed on the other side of the first permanent magnet means so that the second and third permanent magnet means are both repelling the first magnet means to a preselected position between the second and third magnet means. Ordinarily, this preselected position would be approximately centrally between the second and third magnets, but not necessarily so, if not so desired. It could be biased to one side or the other of the central location. In most cases, however, return to a central location would be desired. This would provide a symmetry in the scanning or, in the case of a light display, in the figures generated.

The magnetic repulsion and urging of the shaft toward the preselected position always exists but, of course, when the motor is driven, the magnetic repulsion is overcome by the motor torque, until the magnets get in close proximity to each other. The torque of the motor does not, ordinarily, exceed the repelling force of the magnets when they are in close proximity to each other. Therefore, the magnets do not ordinarily strike each other. The strength of the magnetic repulsion can be adjusted to be greater or smaller, by changing the distance between the magnets or by using stronger or weaker magnets. Thus, if the shaft is driven, say, plus or minus 15 degrees by the stepper motor, the second and third magnets would be placed at, or slightly beyond, that angle. With stronger magnets, they might be placed even farther apart.

Such magnet means are much more easily installed, and adjusted, than are springs. Also, by using magnets, it is easier to obtain a greater force to urge the shaft to its rest position at small angles of shaft rotation.

It is, therefore, an object of this invention to provide permanent magnetic means for magnetically repelling an angularly rotatable element, toward a preselected position.

Another object of this invention is to provide permanent magnet means for magnetically repelling an oscillatable element, such as a shaft, toward a preselected position.

It is another object of this invention to provide a scanner with a reliable scan return means comprised of repelling, permanent magnet means.

It is still another object of this invention to provide an angularly rotatable shaft of a stepper motor, driven by a-c signals, with magnetic repulsion means to urge the shaft toward a preselected position.

It is a further object of this invention to provide a scanner with an easily-installed permanent magnet means for returning the direction of scan toward a preselected axis.

It is a still further object of this invention to provide a laser scanner with an easily-adjustable, permanent magnet means for obtaining harmonic motion and returning the laser beam to a preselected axis.

Still another object is to provide a bracket for adjustably mounting a scanner motor to provide adjustability to define the direction of scan in preselected, or rest, position.

A further object of this invention is to provide a bracket adapted to mount two motor housings so as to be adjustable in rotation and dispose the shafts of the motors at right angles to each other and having repelling, magnetic centering means disposed on said shafts and said bracket and adapted to return each of the shafts to its rest position.

Still other objects will become apparent from the discussion, drawings and claims which follow.

DESCRIPTION OF THE INVENTION

Figure 1:
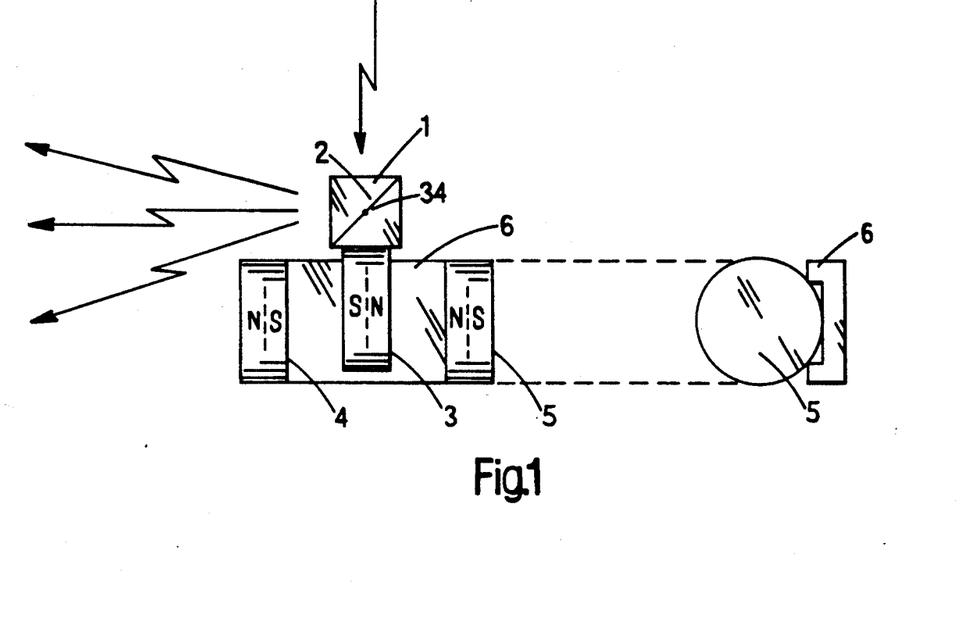
FIG. 1 is an illustration, looking at the end of the angularly rotatable shaft of a laser scanner, showing disk-type magnets, which are polarized from side to side. A side view of the disk-type magnet and its holder is also shown.

In FIG. 1 is shown one embodiment of the device of the invention. The end of an angularly rotatable shaft 1 is shown, which rotates about a center axis 34. Shaft 1 is shown as being rectangular in shape, but it may be cylindrical or other shape. Shaft 1 carries a mirror 2, which is better visualized by looking at FIG. 3 which shows shaft 1 being driven by a small motor. It is to be appreciated that a suitable solenoid driver or other prime mover means may be used in place of the motor.

In FIG. 1, are shown three disk-type, permanent magnets 3, 4 and 5, which are polarized from side to side. It is noted that disk-type magnet 3 is attached to shaft 1. Permanent magnets 4 and 5 are disposed on each side of magnet 3 and are magnetically poled so as to repel magnet 3 toward a preselected position between magnets 4 and 5. When magnet 3 is in its preselected position, shaft 1 is in its preselected, or rest, position. The magnetic repulsion between said magnets 3, 4 and 5 continually urges the shaft toward its rest position which is approximately centrally between magnets 4 and 5. Such magnets also assist in returning the shaft to a rest position as the a-c (alternating) voltage, driving the stepper motor, gets smaller and then passes through zero, in each a-c cycle.

In FIG. 1, magnets 4 and 5 are carried by magnet mounting bar 6 which is fixedly mounted. A side view of magnet 5 and mounting bar 6 is also shown in FIG. 1, in order to better illustrate mounting bar 6 and how magnets 4 and 5 are mounted thereon. Glue, epoxy or other adhesive may be used to attach magnets 4 and 5 to mounting bar 6, as well as to attach magnet 3 to shaft 1.

Disk-type magnets, as shown in FIG. 1, are particularly effective in providing the required magnetic repulsion.

Figure 2:
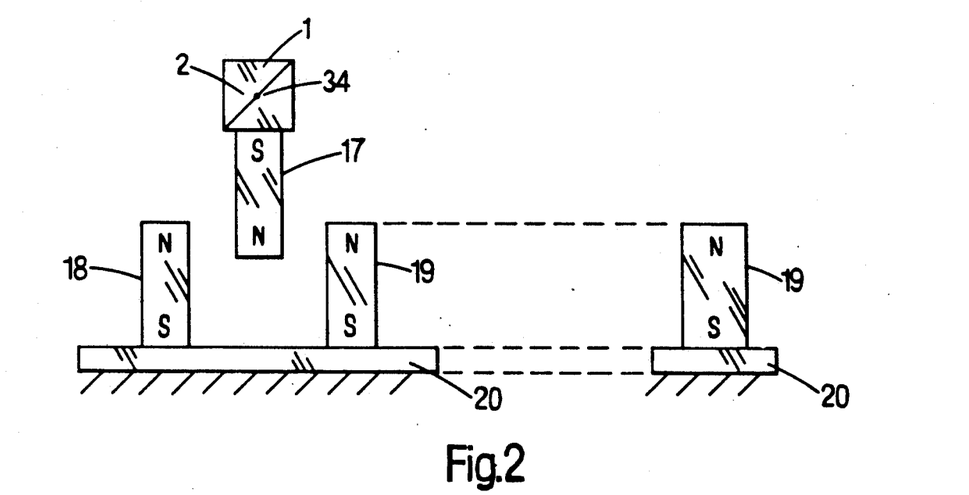
FIG. 2 is an illustration, looking at the end of the angularly rotatable shaft of a laser scanner, showing the use of elongated magnets which have poles at each end.

FIG. 2 illustrates a slightly different embodiment from FIG. 1. In FIG. 2 the magnets are elongated and the magnetic poles are located at the ends of the magnets. Magnet 17 is attached to shaft 1 but, also, in slight difference from FIG. 1, magnets 18 and 19 are mounted on a mounting bar 20, which is fixed, for example, to the housing, or case, (not shown) of the scanner. This can be seen to be in distinction from the structure of FIGS. 1 and 3, wherein the magnet mounting bar 6 is attached to the bracket 8 and a similar mounting bar is shown attached to bracket 15.

A rotated end view of magnet 19 and mounting bar 20 is also shown in FIG. 2, in order to better illustrate the mounting of magnet 19 to mounting bar 20. Of course, magnet 18 is similarly mounted on the mounting bar 20.

Figure 3:
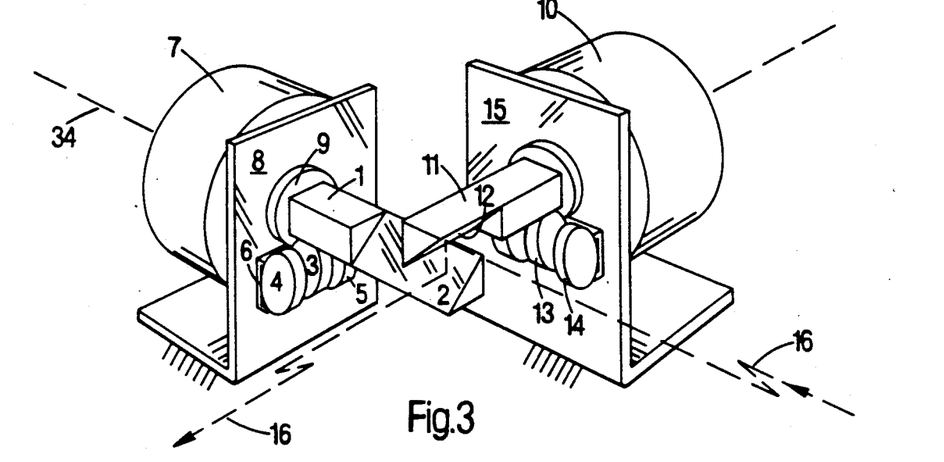
FIG. 3 is an illustration of a scanner having two-axis scanning through the use of two motors, a mount for each motor, and angularly rotatable shafts having mirrors mounted thereon.

FIG. 3 illustrates a scanner having two-axis scanning. Stepper motors 7 and 10 each drive respective shafts, 1 and 11, in an oscillating manner, in accordance with a-c electrical drive signals. Brackets 8 and 15, mounted to a case, or housing, (not shown), hold the motors and provide structure for holding bearings such as bearing 9 which provides for mounting shaft 1. Magnet 3 is attached to shaft 1, as previously explained in connection with FIG. 1, and is repelled by magnets 4 and 5 to a central location between them. Shaft 11 carries magnet 13 which is similarly repelled to a central location between two magnets, one of which is visible, magnet 14.

As mentioned previously, the scanning system may either be a transmitter or a receiver. If the system is a transmitter (and has a laser beam source, which is not shown), the beam 16 strikes and is reflected from mirror 12, thence to mirror 2 and thence outward from the system, as shown. The laser beam lies along a preselected axis when in its undeflected state. This occurs when there is no torque provided by the motors 7 and 10 on shafts 1 and 11, respectively, and the magnets 3 and 13 are returned to their preselected, central positions by magnetic repulsion. This causes the laser beam to return its preselected axis because the angularly rotatable shafts 1 and 11 are returned to their preselected positions.

As the a-c signal driving signal for each motor passes through zero, the shaft would be urged to its rest position. Also, as the a-c signal is weakened, or removed, the shaft would be urged toward its rest position. As a matter of fact, the magnets are always acting to repel the shafts toward their rest position. In this way, a harmonic-like motion of the system is achieved.

The motors are customarily bi-directional stepper motors and are driven by an a-c signal. As an example, to achieve a desired, limited angle of scan, only those windings of the motor are excited which will rotate the shaft, say, 15 degrees in each direction, or through a total angle of 30 degrees. The wave shape of the a-c signal driving said motors may be as desired, but it is usually triangular. Using a stepper motor and magnets as described herein, a-c signal frequencies of from d-c to 150 Hz will operate to provide effective scans. The different scans which may be provided by two stepper motors is much the same as Lissajous figures on the face of an oscilloscope. One motor provides the x-axis scan and the other motor provides the y-axis scan. Crisscrossing beams, figure 8's, rotating squares and circles and other patterns can be created, depending on the a-c drive signals to each motor, and the phase, frequency and amplitude of the signal driving one motor relative to the phase, frequency and amplitude of the signal driving the other motor.

Figure 4:
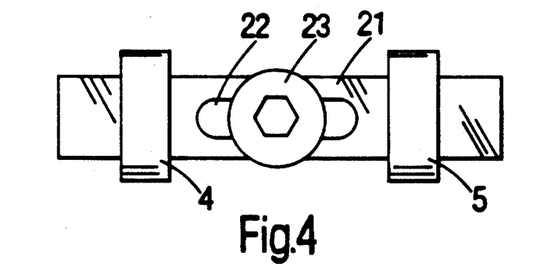
FIG. 4 is an illustration of an adjustable holder for magnet means.
Figure 8:
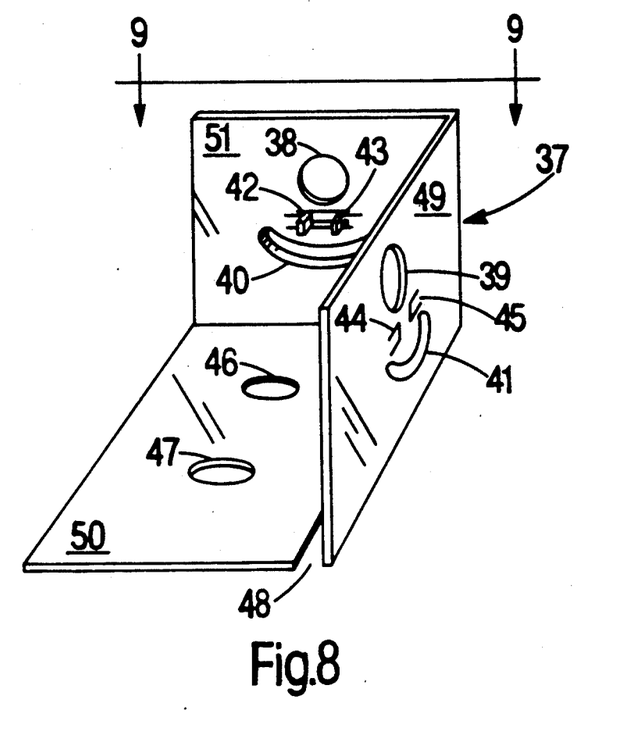
FIG. 8 is an illustration of a single mounting bracket which holds two stepper motors.
Figure 9:
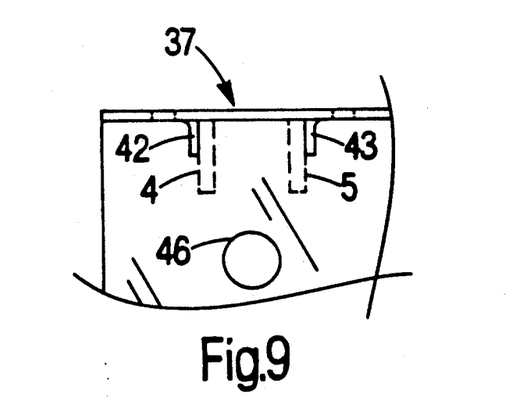
FIG. 9 is a fragmented view of the bracket of FIG. 8 showing, in a top view, from line 9—9 in FIG. 8, the tabs for mounting the magnets.

FIG. 4 illustrates one embodiment in which a magnet mounting bar 21 is adjustable, in order to properly position the magnets 4 and 5 with respect to magnet 3. Slot 22 in the bar 21 permits movement of the bar 21 (and magnets 4 and 5). Nut 23, when tightened, holds the magnets in place. In contrast to a spring-centering device, the magnet mounting bar 21 allows easy alignment of the laser beam, discussed in connection with FIG. 3 and hereafter. Once a proper location has been defined, permanent structure, (such as shown in FIGS. 8 and 9), may be used to mount the magnets on the bracket or the housing.

Figures 5, 6:
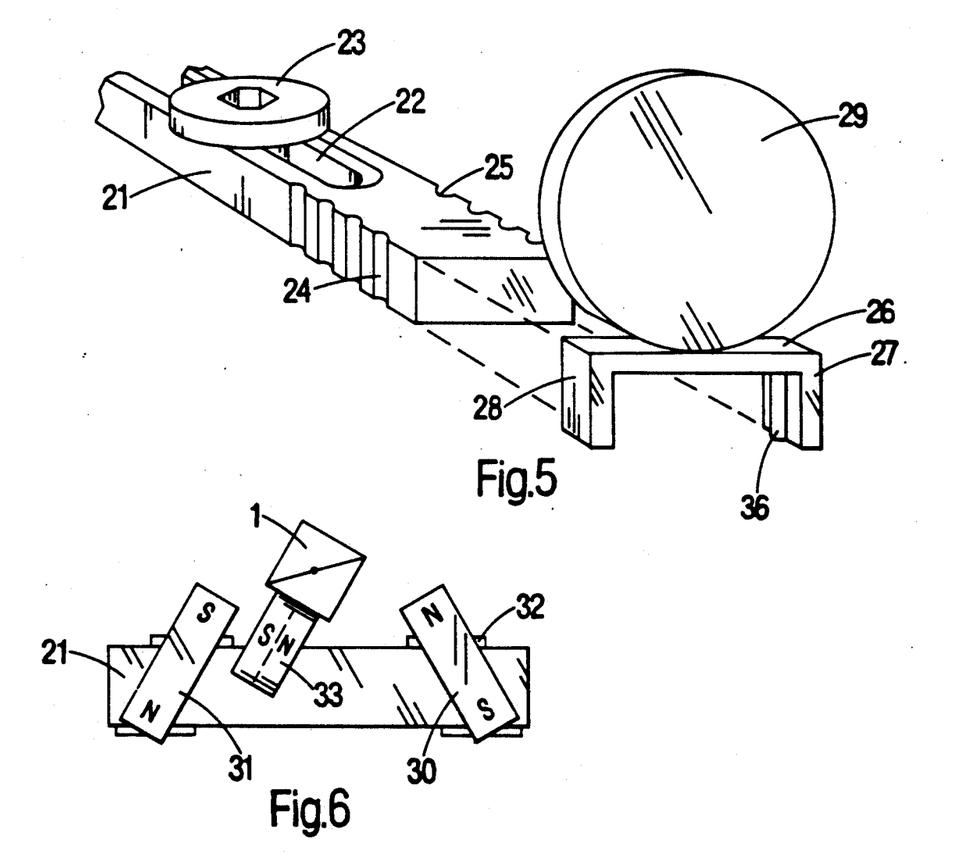
FIG. 5 is an illustration of an adjustable holder and further means for adjusting one magnet on the holder.
FIG. 6 is an illustration of magnets angularly disposed toward the shaft.

FIG. 5 illustrates another means for adjusting the distance between magnets. In this case magnet mounting bar 21 has slots, such as shown at 24 and 25, on one end, to receive and hold carrier 26 to which magnet 29 is attached. Carrier 26 has two legs 27 and 28, each of which has a semi-cylinder, such as shown at 36, which fits into slots such as 24 and 25 and hold magnet 29 firmly in its adjusted position. Moving the magnets closer together, of course, increases the magnetic repulsion, as if increasing the spring constant. The magnet mounting bar 21 is shown as being adjustable, (by reason of slot 22 and nut 23) but in some embodiments, may be permanently, fixedly mounted.

As mentioned previously, it has been found that once a system has been designed and tested for manufacture, the magnets may be fixed in place and little or no adjustment is necessary.

FIG. 6 illustrates the use of magnets angularly disposed toward the rotatably shaft. It also illustrates using a disk-type magnet, disposed on the rotating shaft, in conjunction with longitudinal, or bar, type magnets, mounted to the motor bracket or else the housing. Disk-type magnet 33 is attached to shaft 1. Bar magnets 30 and 31, having poles at each end, are disposed to repel disk-type magnet 33.

Magnets 30 and 31 are angularly disposed toward said shaft, whereby the center magnet 33 becomes in close, parallel alignment with each of the other permanent magnets when the shaft is rotated one way or the other.

One or both of the magnets 30 and 31 may be carried by sliding adjustments, such as shown at 32. Magnet mounting bar 21 may be mounted to a motor-holding bracket or it could be mounted on the case or housing, as depicted in FIG. 2. It is to be appreciated that all of such magnets may be disk-type, all may be longitudinal or they may be a mixture. They only need to be properly oriented to repel.

Figure 7:
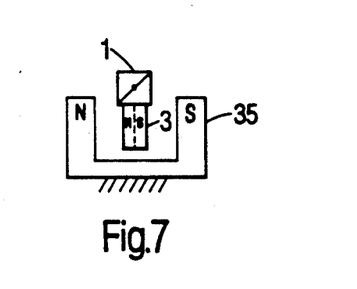
FIG. 7 is an illustration of the use of a horseshoe magnet in the device of the invention.

FIG. 7 illustrates the use of only two magnets to achieve the magnetic centering. Shaft 1 carries a disk-type, permanent magnet 3 which moves between the two poles of horseshoe magnet 35. The poles are disposed so as to repel the disk-type magnet 3 back to a central angular position between the two magnetic poles of the horseshoe magnet 35. Thus, the second and third magnets, of the previous examples, are provided by a single magnet. In FIG. 7, the horseshoe magnet 30 may be attached to the case, or housing, (not shown) it may be attached to the motor-mounting bracket, as shown in FIGS. 1 and 3.

It is noted from FIG. 3 that the laser beam 16 travels to mirror 12 and thence to mirror 2 and is thence emitted outwardly, leaving the system. (If the system is a scanning receiver, rather than a transmitter, the radiation would be entering the system, for reception by some sort of sensor.) Mirror 12, as it oscillates, causes the emitted laser beam to sweep from side to side. Mirror 2, as it oscillates, causes the emitted laser beam to sweep up and down.

In initially aligning the system, the undeflected axis (established by the preselected, or rest, position of the shaft) for the laser beam is selected. The undeflected axis can be seen as a point on a display screen. Several factors help to establish such undeflected axis.

First, the housing of each of the stepper drive motors are rotated (on their mounting brackets) to obtain the greatest scan angle of the laser beam. Technically, this constitutes "phasing" the motors so that their rotational excursion in opposite directions are located within the desired ranges. The motors are thus oriented so as to cause the shaft to rotate an approximately equal amount in each direction, within their range (15 degrees, for example) and the range permitted by the permanent magnets. When such is accomplished, the motor housings are then fixed with respect to the brackets 8 and 15. The motor housings of stepper motors usually have small brackets with holes therethrough, or other means, which allow fixing the housings against rotation.

Magnets 3 and 13, mounted on the shafts, must be quite closely aligned at 45 degrees from their respective mirrors, 2 and 12. This is so that magnets 3 and 13 hang vertically when mirrors 2 and 12 are undeflected. The weight of magnets 3 and 13 then assist the magnetic force in centering such magnets between the other magnets. The magnets 4 and 5 need to be properly spaced to allow a full, desired angular rotation of the shaft and to provide the right amount of magnetic repulsion on the shafts, to return them to their rest positions when the motors have little or no signal. So also, magnet 14 and the cooperating magnet (not shown) on the other side of magnet 13, need to be properly spaced. When such is accomplished for both shafts, the undeflected axis of the laser beam and the rest positions of the two shafts are established.

FIG. 8 shows a bracket 37, adapted to hold two stepper motors of a laser scanner. The bracket can conveniently be formed from a single piece of metal, say, aluminum. The shaft of one of the motors extends through hole 38 and the shaft of the other motor extends through hole 39. The bracket thus mounts the two motor shafts orthogonally with respect to each other. Thus, one bracket accomplishes the function of two brackets 8 and 15 in FIG. 3. Slots 40 and 41 are adapted to allow screws or bolts to be connected to the motor housings and thus, when tightened, fix the motor housings in angular adjustment. This fixes the motor fields and, in this manner, the motor shafts can be oscillated about a center, or rest, position. Tabs 42 and 43 are readily constructed by being punched out of the bracket material. Holes 44 and 45 show where the tabs have been punched out. The base plate of the bracket has holes 46 and 47 for mounting on a base or within a housing. Corner 48 illustrates how a single piece of aluminum forms the three separate faces 49, 50 and 51 of the bracket. The plates may be constructed so that corner 48 is closed up by plate 49 being adhered or fused to base plate 50.

The slots 40 and 41 allow phasing of the motors, to obtain suitable shaft angular rotation. Each motor housing is rotated (with an oscillating electrical drive signal applied) until its shaft oscillates within the desired range. This range is determined by the desired sweep of the laser beam and is cooperatively obtained by the location of the magnets on the bracket.

FIG. 9 is a fragmented top view of the bracket 37, looking downward from line 9—9 in FIG. 8, showing tabs 42 and 43, for clarification. It can be readily seen how small magnets, particularly disk magnets 4 and 5 as described in connection with FIG. 1 may be conveniently attached to such tabs by an adhesive.

Using the parametes, for the motors and the magnets, given as examples herein, tabs 42 and 43 (and the corresponding tabs from tab holes 44 and 45, FIG. 8) would be spaced approximately 0.6 of an inch apart. Disk magnets, (such as 4 and 5), having a diameter of 0.3 of an inch and a thickness of 0.125 inch, when adhered to the inside of such tabs, would then be approximately 0.35 of an inch apart. Such dimensions would allow approximately a 15 degree swing of the shaft and magnet attached thereto. The fixed magnets are thus spaced apart approximately the same distance as the moving magnet is driven by the motor. In other words, the fixed magnets are spaced apart approximately the same arcuate distance as the shaft moves the magnet attached to it. In still other words, the two fixed magnets are approximately disposed at respective ends of the arc through which the other magnet moves. Ordinarily, the magnets never touch. In this way, abrupt motions in scanning are avoided.

Although specific embodiments and certain arrangements have been illustrated and described herein, it will be clear to those skilled in the art that various modifications and embodiments may be made incorporating the spirit and scope of the underlying inventive concepts and that the same are not limited to the particular examples herein shown and described except insofar as indicated by the scope of the appended claims.

I claim:

1. In a system comprising an angularly rotatable shaft and mounting means for said shaft, wherein the improvement comprises said shaft being mounted free of any spring restraint and free of any torsion bar restraint, first permanent magnet means fixedly mounted with respect to said shaft, second and third permanent magnet means fixedly mounted with respect to said mounting means, said second and third permanent magnet means disposed on opposite sides of said first permanent magnet means, said second and third permanent magnet means being poled so as to repel said first permanent magnet means toward a position intermediate said second and third permanent magnet means.

2. The combination recited in claim 1, wherein said second and third permanent magnet means comprise the north and south poles of a single, horseshoe magnet and said first permanent magnet means is a two-sided magnet having a north pole on one side and a south pole on the other side.

3. The combination recited in claim 1, wherein at least one of said permanent magnet means is adjustable in its space relationship with respect to one or more of the remainder of said permanent magnet means.

4. The combination recited in claim 1, wherein said second and third permanent magnet means are disposed apart approximately the same distance said first magnet moves upon the angular rotation of said shaft.

5. The combination recited in claim 1 wherein the force of repulsion between said first magnet means and said second and third magnet means, when said first magnet means is in close proximity to said second magnet means and in close proximity to said third magnet means, is not overcome by the angular rotation provided to said shaft.

6. The combination recited in claim 1, wherein said first, second and third permanent magnet means are each an individual, magnet, and wherein said first magnet hangs vertically from said shaft when said first magnet is in an approximately central angular position between said second and third magnets.

7. The combination recited in claim 1, further including means for causing said shaft to oscillate, whereby said first magnet oscillates about a preselected position, and wherein said second and third magnets are spaced apart approximately equally on both sides of said preselected position.

8. The combination recited in claim 7 wherein said second and third magnets are spaced apart approximately the distance said first magnet oscillates.

9. In a scanner having a shaft, means for mounting said shaft with respect to a base, a prime mover disposed to torque said shaft and to cause said shaft to oscillate in response to electrical signals, a mirror fixedly mounted with respect to said shaft, said mirror adapted to reflect radiation and to oscillate through an angle due to the oscillation of said shaft, wherein the improvement comprises first permanent magnet means fixedly attached with respect to said oscillating shaft, second and third permanent magnet means fixedly attached with respect to said base and disposed on respective sides of said first permanent magnet means therefore said shaft is mounted free of any spring restraint and free of any torsion bar restraint and said second and third permanent magnet means being magnetically disposed to repel said first permanent magnet means toward a preselected position between said second and third permanent magnets.

10. The combination recited in claim 9 further including means for rotatably adjusting said prime mover means to locate the preselected position about which said first magnet means on said shaft oscillates, and said second and third permanent magnet means are disposed on opposite sides of said preselected position, and are approximately the distance apart as the distance said shaft moves said first permanent magnet means.

11. The combination recited in claim 9 wherein said mirror, said prime mover means and said magnets are aligned so that said radiation lies along a preselected axis when said first permanent magnet is in said preselected position between said second and third permanent magnets.

12. The combination recited in claim 9 wherein each of said second and third permanent magnet means are angularly disposed toward said shaft, whereby said first permanent magnet means becomes in close, parallel alignment with said second permanent magnet means when said shaft and said first magnet means are rotated in a first direction and whereby said first permanent magnet means becomes in close, parallel alignment with said third permanent magnet means when said shaft and said first magnet means are rotated in the opposite direction.

13. The combination recited in claim 9, wherein at least one of said permanent magnet means is adjustable in its space relationship with respect to one or more of the remaining permanent magnet means.

14. The combination recited in claim 9 wherein said second and third magnet means are disposed approximately the distance apart as said first magnet means is moved by said shaft as said shaft oscillates and the torque provided to said prime mover by said electrical signals is not so great as to overcome the magnetic repulsion among said magnet means.

15. In a radiation scanner comprising a stepper motor having a housing, mounting bracket means, said housing adjustably, rotatably mounted to said bracket means, said motor adapted to be driven by electrical signals, a shaft angularly driven by said stepper motor, a mirror disposed on said shaft and adapted to reflect radiation and adapted to sweep through an angle when said motor is driven by said signal, wherein the improvement comprises a first permanent magnet means disposed on said shaft, second and third permanent magnet means fixedly disposed with respect to said bracket means, on opposite sides of said first permanent magnet means whereby said shaft is mounted free of any spring restraint and free of any torsion bar restraint, said second and third permanent magnet means magnetically disposed to repel said first permanent magnet means, free of any spring restraint and free of any torsion bar restraint, to an approximately central position between said second and third permanent magnet means, said stepper motor housing being rotatably adjustable to a fixed position to provide a desired angle of sweep of said first magnet between said second and third permanent magnet means when said motor is driven by said electrical signals, whereby the angle of sweep of said mirror is also provided.

16. The combination recited in claim 15 wherein the electrical signals to said stepper motor are adjusted in amplitude and the housing of said stepper motor is rotatably adjusted to provide the widest angle of sweep of said mirror, so as to locate the angle of rotation of said shaft and said first magnet means disposed thereon within the limits defined by said fixedly disposed second and third permanent magnet means.

17. The combination recited in claim 15 further including a second radiation scanner as described therein, the angularly-driven shafts being disposed at right angles with respect to each other and said mirror of one of said scanners being disposed to receive and reflect radiation from the mirror of the other scanner.

18. The combination recited in claim 17 wherein said electrical signals to said first and second stepper motors are adjusted in amplitude to provide suitable angles of sweep of said mirrors when said motors are driven by electrical signals and said housings are rotatably adjusted to fixed positions to cause said magnets disposed on said shafts to sweep within the limits defined by said fixed magnets.

19. The combination recited in claim 18 wherein said fixed permanent magnets are disposed apart approximately the same arcuate distance as said permanent magnets mounted on said shafts are angularly driven by said stepper motors.

20. In a scanner wherein radiation may be reflected by a movable element, the improvement comprising scan return means comprising first permanent magnet means disposed on said movable element, additional permanent magnet means fixedly disposed in proximity on both sides of said first permanent magnet means so as to magnetically repel said first permanent magnet means, and thereby, said movable element, toward a preselected position and wherein said movable element is mounted with no spring restraint and with no torsion bar restraint.

21. The combination recited in claim 20 wherein said scanner comprises a mirror disposed on said movable element, and wherein said mirror is disposed and adapted to reflect radiation.

22. The combination recited in claim 21 wherein the axis of reflection of said radiation, in its undeflected position, is defined by said preselected position of said first permanent magnet means.

23. In a system in which a shaft is adapted to be driven in an oscillating manner by prime mover means, mounting means for mounting said prime mover means, the improvement comprising mounting said shaft with no spring restraint and with no torsion bar restraint, magnetic repelling means for providing harmonic-like motion of said shaft, said magnetic repelling means comprising first permanent magnet means fixedly mounted with respect to said shaft and thereby moved through an arc, second and third permanent magnet means fixedly mounted with respect to said mounting means, said second and third permanent magnet means disposed on opposite sides of said first permanent magnet means, said second and third permanent magnet means being poled so as to repel said first permanent magnet means toward a position intermediate said second and third permanent magnet means.

24. The combination recited in claim 23 wherein said second and said third permanent magnet means are approximately disposed, respectively, at the opposite ends of said arc.

* * * * *